United States Patent [19]

Hatano et al.

[11] E Re. 31,412

[45] Reissued Oct. 11, 1983

[54] PRESSURE-AND-HEAT-SENSITIVE COPYING PAPER

[75] Inventors: Yoshihiro Hatano, Oosaka; Kenji Yamamoto, Yao, both of Japan

[73] Assignee: Yamamoto Kagaku Gosei Kabushiki Kaisha, Osaka, Japan

[21] Appl. No.: 153,660

[22] Filed: May 27, 1980

Related U.S. Patent Documents

Reissue of:

[64] Patent No.: 3,920,510
Issued: Nov. 18, 1975
Appl. No.: 384,304
Filed: Jul. 31, 1973

[30] Foreign Application Priority Data

Aug. 1, 1972 [JP] Japan ..... 47-77081

[51] Int. Cl.[3] ..... B32B 29/00; B41C 1/06; B41M 5/16; B41M 5/18

[52] U.S. Cl. ..... 428/537; 162/162; 282/27.5; 427/146; 427/148; 427/150; 427/151; 428/320.4; 428/320.6; 428/320.8; 428/913; 428/914; 549/223

[58] Field of Search ..... 282/27.5; 162/162; 260/335; 428/320.4, 320.6, 320.8, 913, 914, 537; 427/146, 148, 150, 151

[56] References Cited

U.S. PATENT DOCUMENTS

| | | | |
|---|---|---|---|
| 3,669,712 | 6/1972 | Kimura et al. | 282/27.5 X |
| 3,681,390 | 8/1972 | Lin | 260/335 |
| 3,746,562 | 7/1973 | Lin | 282/27.5 |
| 3,764,369 | 10/1973 | Hoover et al. | 282/27.5 |
| 3,825,561 | 7/1974 | Akamatsu et al. | 260/335 |

FOREIGN PATENT DOCUMENTS

| | | |
|---|---|---|
| 2049503 | 4/1971 | Fed. Rep. of Germany . |
| 2150666 | 4/1972 | Fed. Rep. of Germany . |

*Primary Examiner*—Thomas J. Herbert, Jr.
*Attorney, Agent, or Firm*—Armstrong, Nikaido, Marmelstein & Kubovcik

[57] ABSTRACT

A heat or pressure sensitive copying paper is provided containing a fluoran compound as a color former, said color being developed in said heat or pressure sensitive copying paper through the application of heat or pressure, said fluoran compound being of the formula

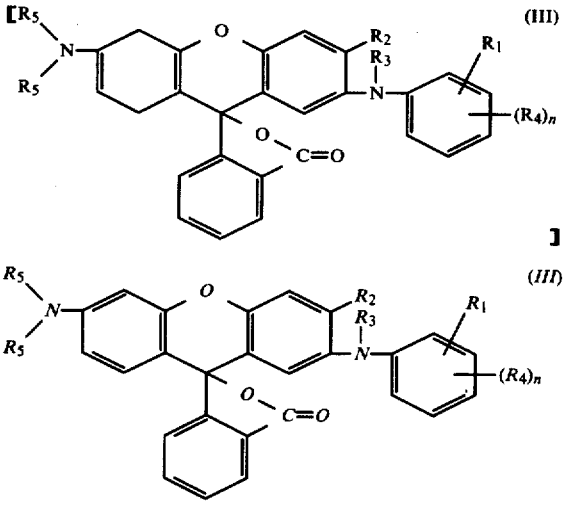

(III)

wherein $R_1$ is halogen; $R_2$ is hydrogen or methyl; $R_3$ is hydrogen, methyl or ethyl; each of $R_4$ is independently halogen or methyl; $R_5$ is methyl or ethyl; and n is 0 or an integer from 1 to 4.

3 Claims, No Drawings

PRESSURE-AND-HEAT-SENSITIVE COPYING PAPER

Matter enclosed in heavy brackets [ ] appears in the original patent but forms no part of this reissue specification; matter printed in italics indicates the additions made by reissue.

The present invention relates to copying paper which is heat or pressure sensitive which contains a color former.

According to a second aspect of the invention, a new series of fluoran compounds are provided which serve as a color former for this paper.

The fluoran compounds of the invention are particularly useful for developing color in the copying paper having a green or black shade. The fluoran compounds have the general formula

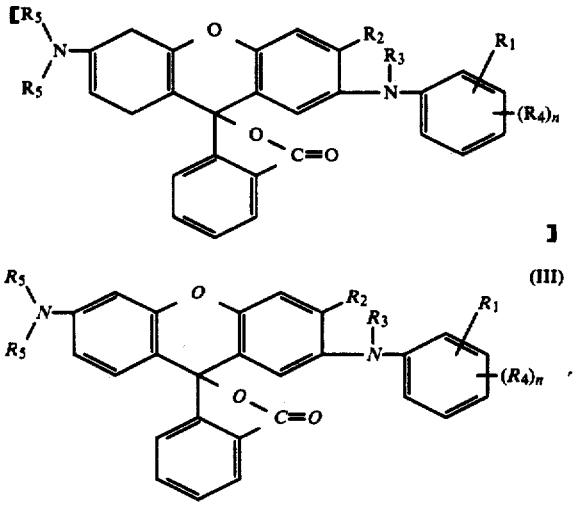

(III)

wherein $R_1$ is halogen; $R_2$ is hydrogen or methyl; $R_3$ is hydrogen, methyl or ethyl; each of $R_4$ is independently halogen or methyl; $R_5$ *methyl* or ethyl; and n is 0 or an integer from 1 to 4.

Such fluroan compounds as (III) may be applied to the pressure-sensitive copying paper in a manner, for example, described in the Japanese Pat. No. 4,614/1971. Also a dye for the pressure-sensitive copying paper is generally applicable to the heat-sensitive copying paper in such a manner as is described in the Japanese Pat. No. 14,039/1970. The product (III) can also be applied to the heat-sensitive copying paper in a similar manner. However, when the dye is used for the heat-sensitive copying paper, it is not used in microcapsules of gelatin etc., as in the case of the pressure-sensitive copying paper. Instead, it is used in a powdery state after being pulverized with a color coupler, so that particularly great importance is attached to the stability of the dye itself. For example, 2-anilino-6-diethylaminofluoran (compound IV, developing into a green color) and 2-anilino-3-methyl-6-diethylaminofluoran (compound V, developing into a black color), disclosed in Belgian Pat. No. 744,705, are known as the dyes for pressure-sensitive copying paper that singly develop into a green or black color:

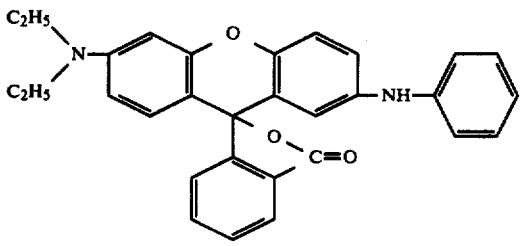

(IV)

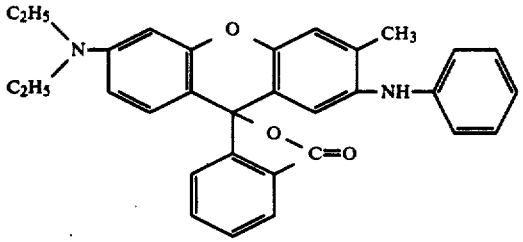

(V)

But they have not enough stability to make themselves suitable for heat-sensitive copying paper. That is, when these dyes are pulverized in an aqueous solution of PVA and, then, mixed with bisphenol A ect., in accordance with the method of the Patent No. 14,039/1970, to prepare a coating material for the heat-sensitive copying paper, the coating material itself develops into a green or black color (hereinafter called "self color development") at this stage already. It is therefore very difficult to make any heat-sensitive copying paper of practical value. In the course of our study to solve the defect of self color development, it was found that self color development could be perfectly prevented by introducing one or more halogens into an anilino radical as shown in the general formula (III). It was also found that the introduction of halogen produces a very useful dye by improving light and water resistance of the color which is developed and by suppressing the sublimation.

These fluroan compounds not only are very useful as the dye for heat-sensitive copying paper but also have a high practical value as the dye for pressure-sensitive copying paper.

Now the present invention is further illustrated by the following specific example:

EXAMPLE 1

Preparation of
[2-chloroanilino-6-diethylaminofluoran]
*2-p-chloroanilino-6-diethylaminofluoran* (VI)

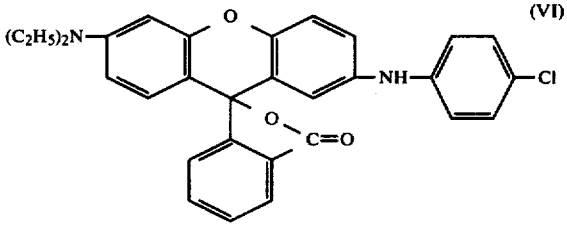

(VI)

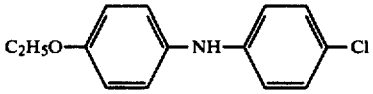

(VII)

-continued

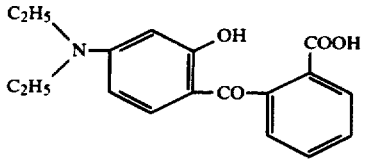

(VIII)

25 g of aceto-p-phenetidide, 36.6 g of p-chlorobromobenzene, 10 g of potassium carbonate, 0.7 g of copper powder and a small quantity of iodine were heated under reflux for 48 hours, and then, after addition of 12 g of potassium hydroxide and 60 ml of ethyl alcohol, further heated under reflux for 20 hours. The product was discharged into water, and the precipitate was filtered off and distilled in vacuo. Then 28.7 g (83 percent of theoretical yield) of 4-chloro-4'-ethoxydiphenylamine (VII) was obtained, and it was found to be white crystals (b.p. 185° to 190° C./4 ,Jg, m.p. 56° to 57° C.).

From the following analysis result, it was confirmed that the product was [$C_{13}H_{12}ClNO$] $C_{14}H_{14}ClNO$.

| | C | H | N |
|---|---|---|---|
| Theoretical | [ 66.90 | 5.14 | 5.91 ] |
| | *67.88* | *5.66* | *5.66* |
| Found | 66.00 | 5.12 | 5.95 |

Then 10 g of the compound (VII), 13.4 g of 4-diethylamino-2-hydroxy-2'-carboxybenzophenone (VIII) and 70 g of concentrated sulfuric acid were stirred at ordinary temperature for 48 hours. The product was discharged into 1 l of water, and the precipitate was filtered off, washed with an aqueous solution of caustic soda, and recrystallized with toluene. Then 11.8 g (55.5 percent of theoretical yield) of 2-p-chloroanilino-6-diethylaminofluoran (VI) was obtained. The product was a slightly colored powder (m.p. 210° to 213° C.) and developed a green color in the presence of a member selected from a group consisting of clay, resin, bisphenol A and the like.

From the following analysis result, it was confirmed that the product was $C_{30}H_{25}ClN_2O_3$.

| | C | H | N |
|---|---|---|---|
| Theoretical | 72.50 | 5.04 | 5.64 |
| Found | 73.10 | 5.11 | 5.38 |

EXAMPLE 2

Preparation of 2-m-chloroanilino-6-diethylaminofluoran (IX)

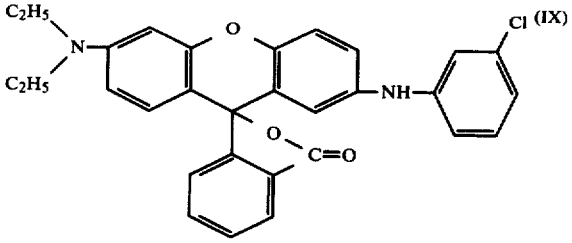

(IX)

-continued

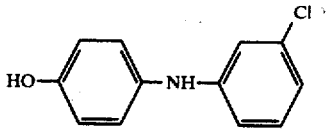

(X)

64 g of m-chloroaniline, 55 g of hydroquinone and 1 g of sulfanilic acid were allowed to react with each other at 200° C. for 20 hours, and the product was dissolved in an aqueous solution of caustic soda and the filtered. The filtrate was made acidic with acetic acid, and the precipitate was distilled in vacuo. Then 35 g (31.8 percent of theoretical yield) of 3-chloro-4'-hydroxydiphenylamine (X) was obtained, and it was found to be yellow crystals (b.p. 245° to 247° C./11 mmHg, m.p. 96° to 98° C.).

From the following analysis result, it was confirmed that the product was $C_{12}H_{10}ClNO$.

| | C | H | N |
|---|---|---|---|
| Theoretical | 65.60 | 4.56 | 6.38 |
| Found | 65.20 | 4.70 | 6.38 |

Then 14.1 g of the compound (X), 18.5 g of the compound (VIII) and 90 g of concentrated sulfuric acid were stirred at ordinary temperature for 48 hours. The product was discharged into 1 l of water, and the precipitate was filtered off, washed with an aqueous solution of caustic soda, and recrystallized with toluene. Then 13 g (40.8 percent of theoretical yield) of 2-m-chloroanilino-6-diethylaminofluoran (IX) was obtained. The product was a pale-purple powder (m.p. 186° to 187° C.) and developed a green color in the presence of clay or resin and a black color in the presence of bisphenol A.

From the following analysis result, it was confirmed that the product was $C_{30}H_{25}ClN_2O_3$.

| | C | H | N |
|---|---|---|---|
| Theoretical | 72.50 | 5.04 | 5.64 |
| Found | 71.94 | 4.97 | 5.47 |

EXAMPLE 3

Preparation of 2-o-chloroanilino-6-diethylaminofluoran (XI)

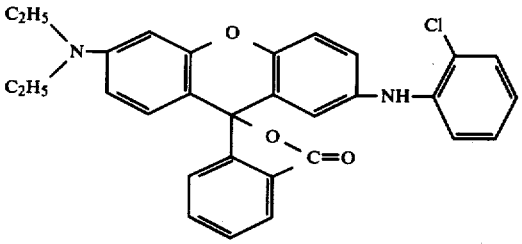

(XI)

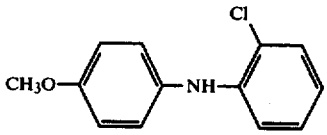

(XII)

25 g of p-acetanisidide, 35 g of o-chlorobromobenzene, 10 g of potassium carbonate, 0.7 g of copper powder and a small quantity of iodine were heated under reflux for 48 hours, and then, after addition of 12 g of potassium hydroxide and 60 ml of ethyl alcohol, further heated under reflux for 20 hours. The product was discharged into water, extracted with 100 ml of toluene, and distilled in vacuo. Then 29.2 g (82.5 percent of theoretical yield) of 2-chloro-4'-methoxydiphenylamine (XII) was obtained, and it was found to be a yellow viscous liquid (b.p. 205° to 210° C./7 mmHg).

From the following analysis result, it was confirmed that the product was $C_{13}H_{12}ClNO$.

| | C | H | N |
|---|---|---|---|
| Theoretical | 66.90 | 5.14 | 5.91 |
| Found | 67.20 | 5.21 | 6.01 |

Then 10 g of the compound (XII), 13.4 g of the compound (VIII) and 50 g of concentrated sulfuric acid were stirred at ordinary temperature for 48 hours. The product was discharged into 1 l of water, and the precipitate was filtered off, washed with an aqueous solution of caustic soda, and recrystallized with toluene. Then 12.6 g (59.2 percent of theoretical yield) of 2-o-chloroanilino-6-diethylaminofluoran (XI) was obtained. The product was a pale-pink powder [m.p. 178° to 180° C] *m.p. 212.5° to 213.5° C.* and developed a black color in the presence of clay and bisphenol A and a green color in the presence of resin.

From the following analysis result, it was confirmed that the product was $C_{30}H_{25}ClN_2O_3$.

| | C | H | N |
|---|---|---|---|
| Theoretical | 72.50 | 5.04 | 5.64 |
| Found | 73.00 | 5.05 | 5.48 |

EXAMPLE 4

Preparation of
2-(3',5'-dichloroanilino)-6-diethylaminofluoran (XIII)

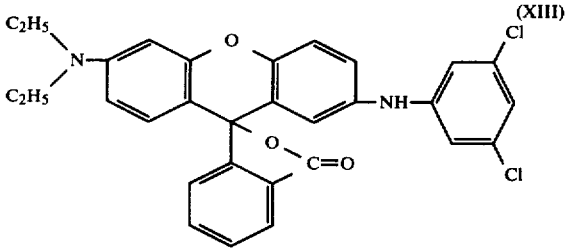

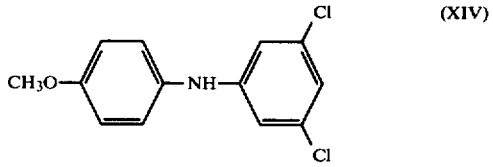

28 g of 3,5-dichloroaniline, 19 g of hydroquinone and 0.3 g of sulfanilic acid were allowed to react with each other at 200° C. for 20 hours, and the product was dissolved in the solution of 10 g of caustic soda in 200 ml of water and then filtered. The filtrate was added with 26.3 g of dimethylsulfuric acid, heated under reflux for 5 hours, and then cooled. The precipitate was filtered off and distilled in vacuo. Then 35 g (76 percent of theoretical yield) of 3,5-dichloro-4'-methoxydiphenylamine (XIV) was obtained, and it was found to be yellow crystals (b.p. 226° to 230° C./4 mm Hg, m.p. 106° to 107° C.).

From the following analysis result, it was confirmed that the product was $C_{13}H_{11}Cl_2NO$.

| | C | H | N |
|---|---|---|---|
| Theoretical | 58.21 | 4.10 | 5.22 |
| Found | 57.20 | 3.95 | 5.12 |

Then 15 g of the compound (XIV), 17.6 g of the compound (VIII) and 100 g of concentrated sulfuric acid were condensed by stirring at ordinary temperature for 48 hours. The product was discharged into 1 l of water, and the precipitate was filtered off, washed with an aqueous solution of caustic soda, and recrystallized with toluene. Then 18 g (60.5 percent of theoretical yield) of 2-(3',5'-dichloroanilino)-6-diethylaminofluoran (XIII) was obtained. The product developed a green color in the presence of resin and a black color in the presence of clay and bisphenol A.

From the following analysis result, it was confirmed that the product was $C_{30}H_{24}Cl_2N_2O_3$.

| | C | H | N |
|---|---|---|---|
| Theoretical | 67.80 | 4.52 | 5.28 |
| Found | 68.20 | 4.59 | 5.10 |

EXAMPLE 5

Preparation of
2-(3',4'-dichloroanilino)-6-diethylaminofluoran (XV)

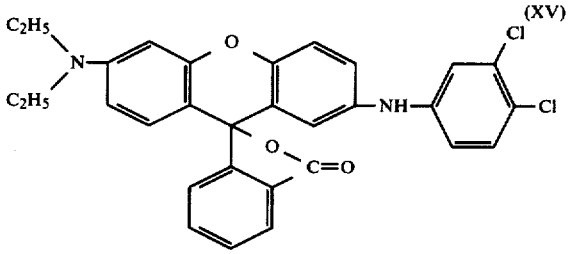

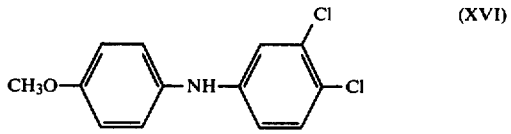

33 g of p-acetanisidide, 68 g of 3,4-dichlorobromobenzene, 16 g of potassium carbonate, 1.5 g of copper powder and a small quantity of iodine were heated under reflux for 48 hours, and then, after addition of 16 g of potassium hydroxide and 100 ml of ethyl alcohol, further heated under reflux for 20 hours. The product was discharged into water, and the precipitate was filtered off and distilled in vacuo. Then 39 g (73 percent of theoretical yield) of 3,4-dichloro-4'-methoxydiphenylamine (XVI) was obtained, and it was found to be pale-yellow crystals (b.p. 228° to 232° C./4 mmHg, m.p. 101° to 102° C.).

From the following analysis result, it was confirmed that the product was $C_{13}H_{11}Cl_2NO$.

| | C | H | N |
|---|---|---|---|
| Theoretical | 58.21 | 4.10 | 5.22 |
| Found | 58.15 | 3.99 | 5.16 |

Then 30 g of the compound (XVI), 35 g of the compound (VIII) and 175 g of concentrated sulfuric acid were stirred at ordinary temperature for 48 hours to cause a condensation reaction. The product was discharged into 1 l of water, and the precipitate was filtered off, washed with an aqueous solution of caustic soda, and recrystallized with toluene. Then 30.8 g (51.8 percent of theoretical yield) of 2-(3',4'-dichloroanilino)-6-diethylaminofluoran (XV) was obtained. The product was slightly colored powder (m.p. 189° to 190° C.), and developed a black color in the presence of clay, a green color with resin, and a blackish green color with bisphenol A.

From the following analysis result, it was confirmed that the product was $C_{30}H_{24}Cl_2N_2O_3$.

| | C | H | N |
|---|---|---|---|
| Theoretical | 67.80 | 4.52 | 5.28 |
| Found | 68.00 | 4.54 | 5.20 |

EXAMPLE 6

Preparation of
2-p-chloroanilino-3-methyl-6-diethylaminofluoran
(XVII)

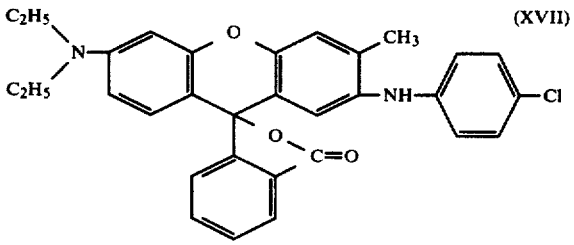

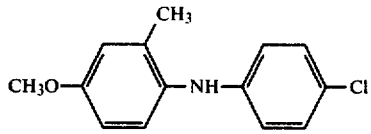

40 g of 3-methyl-p-acetanisidide (Beilstein, Supplement No. 1, vol. 13, p. 223), 51.5 g of p-chlorobromobenzene, 17.5 g of potassium carbonate, 1 g of copper powder and a small quantity of iodine were allowed to react with each other at 200° C. for 40 hours, and then, after addition of 20 g of potassium hydroxide and 100 ml of ethyl alcohol, further heated under reflux for 24 hours. The product was discharged into water, extracted with 200 ml of benzene, and distilled in vacuo. Then 48.2 g (87.3 percent of theoretical yield) of 2-methyl-4-methoxy-4'-chlorodiphenylamine (XVIII) was obtained, and it was found to be a yellow viscous liquid (b.p. 185° to 187° C./3 mmHg).

From the following analysis result, it was confirmed that the product was $C_{14}H_{14}ClNO$.

| | C | H | N |
|---|---|---|---|
| Theoretical | 67.88 | 5.66 | 5.66 |
| Found | 67.40 | 5.42 | 5.45 |

Then 24.75 g of the compound (XVIII) 31.3 g of the compound (VIII) and 150 g of concentrated sulfuric acid were stirred at ordinary temperature for 40 hours. The product was discharged into 700 ml of water, and the precipitate was filtered off, washed with an aqueous solution of caustic soda, and recrystallized with 600 ml of toluene. Then 41.3 g (80.8 percent of theoretical yield) of 2-p-chloroanilino-3-methyl-6-diethylaminofluoran (XVII) was obtained. The product was a pale-yellow powder (m.p. 212° to 213° C.), and developed a black color in the presence of clay, resin and bisphenol A respectively.

From the following analysis result, it was confirmed that the product was $C_{31}H_{27}ClN_2O_3$.

| | C | H | N |
|---|---|---|---|
| Theoretical | 72.87 | 5.29 | 5.48 |
| Found | 73.93 | 5.35 | 5.31 |

EXAMPLE 7

Preparation of
2-m-chloroanilino-3-methyl-6-diethylaminofluoran
(XIX)

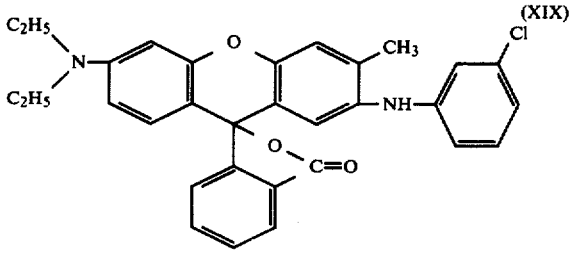

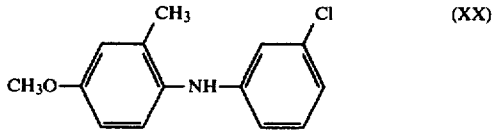

54.5 g of 3-methyl-p-acetanisidide, 70 g of m-chlorobromobenzene, 25 g of potassium carbonate, 1 g of copper powder and a small quantity of iodine were allowed to react with each other at 220° C. for 24 hours, and then, after addition of 27 g of potassium hydroxide and 150 ml of ethanol, further heated under reflux for 20 hours. The product was discharged into water, and the precipitate was filtered off and distilled in vacuo. Then 61 g (81 percent of theoretical yield) of 2-methyl-4-methoxy-3'-chlorodiphenylamine (XX) was obtained, and it was found to be pale-yellow crystals (b.p. 153° to 154° C./3 mmHg, m.p. 75° to 77° C.).

From the following analysis result, it was confirmed that the product was $C_{14}H_{14}ClNO$.

| | C | H | N |
|---|---|---|---|
| Theoretical | 67.88 | 5.66 | 5.66 |

-continued

| | C | H | N |
|---|---|---|---|
| Found | 67.20 | 5.38 | 5.41 |

Then 24.75 g of the compound (XX), 31.3 g of the compound (VIII) and 150 g of concentrated sulfuric acid were stirred at ordinary temperature for 48 hours. The product was discharged into 1 l of water. And the precipitate was filtered off, washed with an aqueous solution of caustic soda, and recrystallized with 300 ml of toluene and 4 g of activated charcoal. Then 27.5 g (53.8 percent of theoretical yield) of 2-m-chloroanilino-3-methyl-6-diethylaminofluoran (XIX) was obtained. The product was a white powder (m.p. 211° to 212° C.), and developed a black color in the presence of clay, resin and bisphenol A, respectively. From the following analysis result, it was confirmed that the product was $C_{31}H_{27}ClN_2O_3$.

| | C | H | N |
|---|---|---|---|
| Theoretical | 72.87 | 5.29 | 5.48 |
| Found | 73.64 | 5.11 | 5.27 |

EXAMPLE 8

Preparation of
2-o-chloroanilino-3-methyl-6-diethylaminofluoran
(XXI)

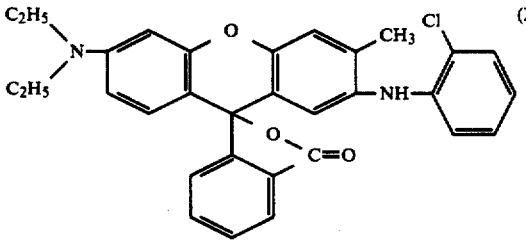

(XXI)

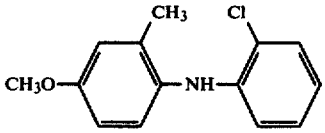

(XXII)

42.5 g of 3-methyl-p-acetanisidide, 50 g of o-chlorobromobenzene, 18 g of potassium carbonate, 1 g of copper powder and a small quantity of iodine were allowed to react with each other at 220° C. for 24 hours, and then, after addition of 30 g of potassium hydroxide and 100 ml of ethyl alcohol, further heated under reflux for 20 hours. The product was discharged into water, and the precipitate was filtered off and distilled in vacuo. Then 46.9 g (80 percent of theoretical yield) of 2-methyl-4-methoxy-2'-chlorodiphenylamine (XXII) was obtained, and it was found to be yellow crystals (m.p. 90° to 91° C., b.p. 165° to 170° C./3 mmHg).

From the following analysis result, it was confirmed that the product was $C_{14}H_{14}ClNO$.

| | C | H | N |
|---|---|---|---|
| Theoretical | 67.88 | 5.66 | 5.66 |
| Found | 67.05 | 5.56 | 5.68 |

Then 17 g of the compound (XXII), 21.5 g of the compound (VIII) and 120 g of concentrated sulfuric acid were stirred at ordinary temperature for 40 hours. The product was discharged into 500 ml of water, and the precipitate was filtered off, washed with an aqueous solution of caustic soda, and recrystallized with 350 ml of toluene. Then 21 g (59.8 percent of theoretical yield) of 2-o-chloroanilino-3-methyl-6-diethylaminofluoran (XXI) was obtained. The product was a slightly colored powder (m.p. 192° to 193° C.).

From the following analysis result, it was confirmed that the product was [$C_{13}H_{27}ClN_2O_3$] $C_{31}H_{27}ClN_2O_3$.

| | C | H | N |
|---|---|---|---|
| Theoretical | 72.87 | 5.29 | 5.48 |
| Found | 72.91 | 5.23 | 5.25 |

EXAMPLE 9

Preparation of
2-p-bromoanilino-3-methyl-6-diethylaminofluoran
(XXIII)

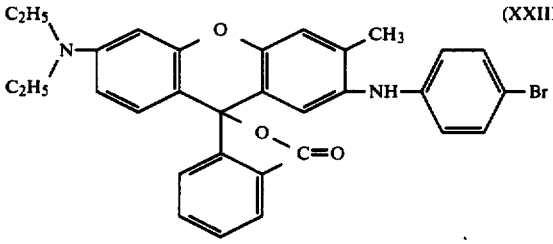

(XXIII)

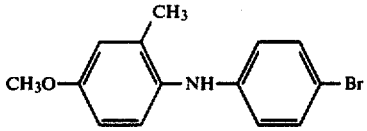

(XXIV)

18.95 g of 3-methyl-p-acetanisidide, 25 g of p-dibromobenzene, 9 g of potassium carbonate, 0.5 g of copper powder and a small quantity of iodine were allowed to react with each other at 220° C. for 20 hours, and then, after addition of 20 g of potassium hydroxide and 100 ml of ethyl alcohol, further heated under reflux for 22 hours. The product was discharged into water, extracted with 100 ml of toluene, and distilled in vacuo. Then 11.5 g (37.2 percent of theoretical yield) of 2-methyl-4-methoxy-4'-bromodiphenylamine (XXIV) was obtained, and it was found to be a yellow viscous liquid (b.p. 195° to 200° C./4 mmHg).

From the following analysis result, it was confirmed that the product was $C_{14}H_{14}BrNO$.

| | C | H | N |
|---|---|---|---|
| Theoretical | 59.57 | 4.79 | 4.79 |
| Found | 59.91 | 4.88 | 4.75 |

Then 5 g of the compound (XXIV), 5.36 g of the compound (VIII) and 35 g of concentrated sulfuric acid were stirred at ordinary temperature for 40 hours, and the product was discharged into 200 ml of water. The precipitate was filtered off, washed with an aqueous solution of caustic soda, and recrystallized with 100 ml of toluene. Then 6.9 g (72.6 percent of theoretical yield) of 2-p-bromoanilino-3-methyl-6-diethylaminofluoran (XXIII) was obtained. The product was a slightly colored powder, and developed a black color in the presence of clay, resin and a bisphenol A respectively.

From the following analysis result, it was confirmed that the product was $C_{31}H_{27}BrN_2O_3$.

| | C | H | N |
|---|---|---|---|
| Theoretical | 67.03 | 4.86 | 5.05 |
| Found | 67.82 | 4.64 | 4.95 |

EXAMPLE 10

Preparation of

[2-(4'-chloro-3'-methylanilino)-3-methyl-6'-diethylaminofluoran]

*2-(4'-chloro-3'-methylanilino)-3-methyl-6-diethylaminofluoran* (XXV)

(XXV)

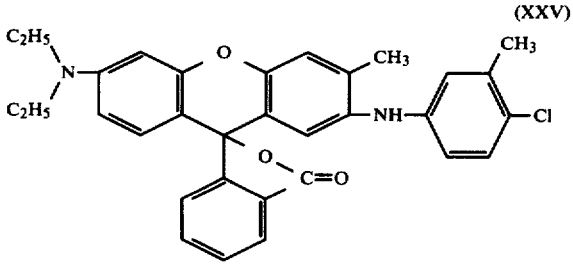

(XXVI)

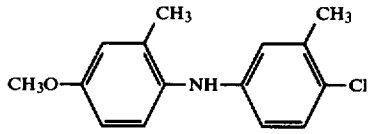

40 g of 3-methyl-p-acetanisidide, 50 g of 3-methyl-4-chlorobromobenzene, 17.5 g of potassium carbonate, 1 g of copper powder and a small quantity of iodine were allowed to react with each other at 210° C. for 24 hours, and then, after addition of 20 g. of potassium hydroxide and 100 ml of ethyl alcohol, further heated under reflux for 20 hours. The product was discharged into water, and the precipitate was filtered off and distilled in vacuo. The 48.7 g (83.4 percent of theoretical yield) of 2,3'-dimethyl-4-methoxy-4'-chlorodiphenylamine (XXVI) was obtained, and it was found to be pale-yellow crystals (b.p. 200° to 205° C./4 mmHg, m.p. 86° to 87° C.).

From the following analysis result, it was confirmed that the product was $C_{15}H_{16}ClNO$.

| | C | H | N |
|---|---|---|---|
| Theoretical | 68.83 | 6.12 | 5.35 |
| Found | 68.16 | 6.04 | 5.22 |

Then 26.15 g of the compound (XXVI), 31.3 g of the compound (VIII) and 150 g of concentrated sulfuric acid were stirred at ordinary temperature for 40 hours, and the product was discharged into 1 l of water. The precipitate was filtered off, washed with an aqueous solution of caustic soda, and recrystallized with 600 ml of toluene. The 40.1 g (65 percent of theoretical yield) of 2-(3'-methyl-4'-chloroanilino)-3-methyl-6-diethylaminofluoran (XXV) was obtained. The product was a slightly colored powder (m.p. 148° to 150° C.) and developed a black color in the presence of clay, resin and bisphenol A, respectively.

From the following analysis result, it was confirmed that the product was $C_{32}H_{29}ClN_2O_3.C_7H_8$.

| | C | H | N |
|---|---|---|---|
| Theoretical | 75.91 | 6.00 | 4.54 |
| Found | 75.03 | 5.54 | 4.52 |

EXAMPLE 11

Preparation of 2-(3',5'-dichloroanilino)-3-methyl-6-diethylaminofluoran (XXVII)

(XXVII)

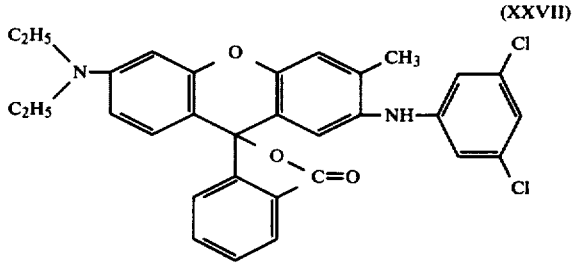

(XXVIII)

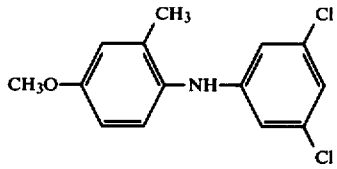

40 g of 3-methyl-p-acetanisidide, 55.5 g of 3,5-dichlorobromobenzene, 17.5 g of potassium carbonate, 1 g of copper powder and a small quantity of iodine were allowed to react with each other for 24 hours, and then, after addition of 20 g of potassium hydroxide and 100 ml of ethyl alcohol, further heated under reflux for 20 hours. The product was discharged into water, and the precipitate was filtered off and distilled in vacuo. Then 44 g (69.8 percent of theoretical yield) of 2-methyl-4-methoxy-3',5'-dichlorodiphenylamine (XXVIII) was obtained, and it was found to be pale-yellow crystals (b.p. 192° to 193° C./4 mmHg, m.p. 104° to 106° C.).

From the following analysis result, it was confirmed that the product was $C_{14}H_{13}Cl_2NO$.

| | C | H | N |
|---|---|---|---|
| Theoretical | 59.57 | 4.61 | 4.96 |
| Found | 59.86 | 4.74 | 4.97 |

Then 28.2 g of the compound (XXVIII) 31.3 g of the compound (VIII) and 150 g of concentrated sulfuric acid were stirred at ordinary temperature for 24 hours, and the product was discharged into 1 l of water. The precipitate was filtered off, washed with an aqueous solution of caustic soda, and recrystallized with 700 ml of toluene. Then 41.7 g (76.5 percent of theoretical yield) of 2-(3',5'-dichloroanilino)-3-methyl-6-diethylaminofluoran (XXVII) was obtained. The product was a white powder (m.p. 224° to 225° C.) and developed a purple color in the presence of clay and a brown color in the presence of resin and bisphenol A, respectively.

From the following analysis result, it was confirmed that the product was $C_{31}H_{26}Cl_2N_2O_3$.

| | C | H | N |
|---|---|---|---|
| Theoretical | 68.26 | 4.77 | 5.14 |
| Found | 67.86 | 4.68 | 4.89 |

EXAMPLE 12

Preparation of 2-(3',4'-dichloroanilino)-3-methyl-6-diethylaminofluoran (XXIX)

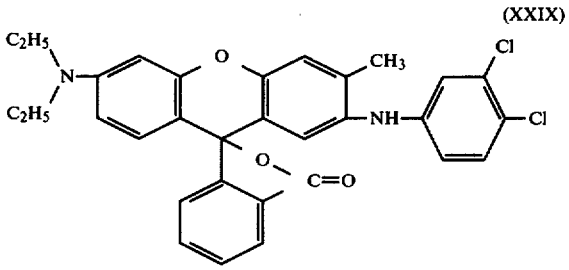

(XXIX)

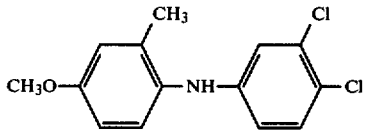

(XXX)

18 g of 3-methyl-p-acetanisidide, 25 g of 3,4-dichlorobromobenzene, 8 g of potassium carbonate, 0.5 g of copper powder and a small quantity of iodine were allowed to react with each other at 200° C. for 24 hours, and then, after addition of 10 g of potassium hydroxide and 50 ml of ethanol, further heated under reflux for 22 hours. The product was discharged into water, extracted with 100 ml of toluene, and distilled in vacuo. Then 19 g (66.9 percent of theoretical yield) of 2-methyl-4-methoxy-3',4'-dichlorodiphenylamine (XXX) was obtained, and it was found to be yellow crystals (b.p. 203° to 210° C./3 mmHg, m.p. 80° to 90° C.).

From the following analysis result, it was confirmed that the product was $C_{14}H_{13}Cl_2NO$.

| | C | H | N |
|---|---|---|---|
| Theoretical | 59.57 | 4.61 | 4.96 |
| Found | 57.63 | 4.32 | 4.92 |

Then 18 g of the compound (XXX), 20 g of the compound (VIII) and 100 g of concentrated sulfuric acid were stirred at ordinary temperature for 44 hours, and the product was discharged into 500 ml of water. The precipitate was filtered off, washed with an aqueous solution of caustic soda, and recrystallized with 400 ml of toluene. Then 23.7 g (68 percent of theoretical yield) of 2-(3',4'-dichloroanilino)-3-methyl-6-diethylaminofluoran (XXIX) was obtained. The product was a slightly colored powder (m.p. 190° to 191° C.) and developed a purple color in the presence of clay and a black color in the presence of resin and bisphenol A, respectively.

From the following analysis result, it was confirmed that the product was $C_{31}H_{26}Cl_2N_2O_3$.

| | C | H | N |
|---|---|---|---|
| Theoretical | 68.26 | 4.77 | 5.14 |
| Found | 66.95 | 4.34 | 4.83 |

EXAMPLE 13

Preparation of 2-(2',5'-dichloroanilino)-6-diethylaminofluoran (XXXI)

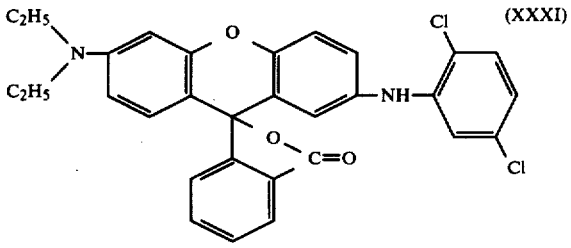

(XXXI)

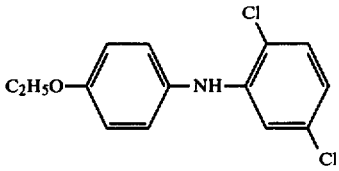

(XXXII)

30 g of p-acetophenetidide, 45.5 g of 2,5-dichlorobromobenzene, 13 g of potassium carbonate, 1 g of copper powder and a small quantity of iodine were allowed to react with each other at 210° C. for 24 hours, and then, after addition of 15 g of potassium hydroxide and 75 ml of ethanol, further heated under reflux for 20 hours. The product was discharged into water, extracted with 150 ml of toluene, and distilled in vacuo. Then 33.1 g (70 percent of theoretical yield) of 2,5-dichloro-4'-ethoxydiphenylamine (XXXII) was obtained, and it was found to be a yellow viscous liquid (b.p. 190° to 195° C./4 mmHg).

From the following analysis result, it was confirmed that the product was $C_{14}H_{13}Cl_2NO$.

| | C | H | N |
|---|---|---|---|
| Theoretical | 59.57 | 4.61 | 4.96 |
| Found | 59.73 | 4.64 | 4.98 |

Then 10 g of the compound (XXXII), 11.1 g of the compound (VIII) and 75 g of concentrated sulfuric acid were stirred at ordinary temperature for 40 hours, and the product was discharged into 500 ml of water. The precipitate was filtered off, washed with an aqueous solution of caustic soda, and recrystallized with 200 ml of toluene. Then 10.5 g (55.8 percent of theoretical yield) of 2-(2',5'-dichloroanilino)-6-diethylaminofluoran (XXXI) was obtained. The product was a white powder (m.p. 184° to 185° C.) and developed a black color in the presence of clay and bisphenol A, respectively, and a green color in the presence of resin.

From the following analysis result, it was confirmed that the product was $C_{30}H_{24}Cl_2N_2O_3$.

| | C | H | N |
|---|---|---|---|
| Theoretical | 67.80 | 4.52 | 5.28 |
| Found | 67.65 | 4.50 | 5.30 |

EXAMPLE 14

Preparation of 2-(4'-chloro-N-methylanilino)-6-diethylaminofluoran (XXXIII)

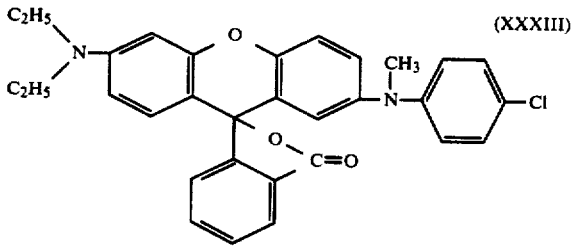

(XXXIII)

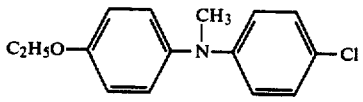

(XXXIV)

10 g of the compound (VII, see EXAMPLE 1) and 6.5 g of dimethylsulfuric acid were allowed to react with each other at 90° C. for 20 hours, and then, after addition of 60 g of a 10 percent aqueous solution of caustic soda, further heated under stirring for 1 hour. The product was extracted with 50 ml of toluene and distilled in vacuo. Then 8.8 g (83.2 percent of theoretical yield) of 4-ethoxy-4'-chloro-N-methyl-diphenylamine (XXXIV) was obtained, and it was found to be pale-yellow crystals (b.p. 185° to 188° C./4 mmHg, m.p. 56° to 57° C.).

From the following analysis result, it was confirmed that the product was $C_{15}H_{16}ClNO$.

| | C | H | N |
|---|---|---|---|
| Theoretical | 68.83 | 6.12 | 5.35 |
| Found | 68.64 | 6.10 | 5.27 |

Then 7 g of the compound (XXXIV), 8.9 g of the compound (VIII) and 60 g of concentrated sulfuric acid were stirred at ordinary temperature for 48 hours, and the product was discharged into 500 ml of water. The precipitate was filtered off, washed with an aqueous solution of caustic soda, and recrystallized with 120 ml of toluene. Then 10.5 g (71 percent of theoretical yield) of 2-(4'-chloro-N-methylanilino)-6-diethylaminofluoran (XXXIII) was obtained. The product was a white powder (m.p. 189° to 190° C.) and developed a green color in the presence of clay, resin and bisphenol A, respectively.

From the following analysis result, it was confirmed that the product was $C_{31}H_{27}ClN_2O_3$.

| | C | H | N |
|---|---|---|---|
| Theoretical | 72.87 | 5.29 | 5.48 |
| Found | 72.43 | 5.16 | 5.36 |

EXAMPLE 15

Preparation of 2-(4'-chloro-N-ethylanilino)-6-diethylaminofluoran (XXXV)

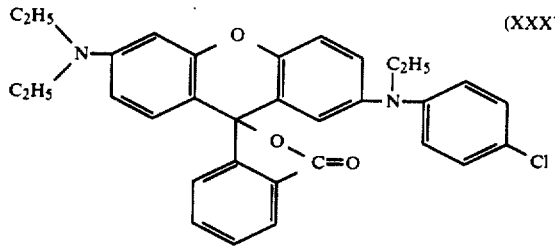

(XXXV)

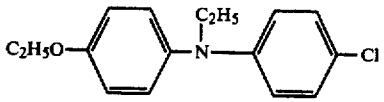

(XXXVI)

10 g of the compound (VII, see EXAMPLE 1) and 10 g of diethylsulfuric acid were allowed to react with each other at 90° C. for 17 hours, and then, after addition of 50 g of a 10 percent aqueous solution of caustic soda, further heated under stirring for 1 hour. The product was extracted with 50 ml of toluene and distilled in vacuo. Then 7.3 g (65.5 percent of theoretical yield) of 4-ethoxy-4'-chloro-N-ethyldiphenylamine (XXXVI) was obtained, and it was found to be white crystals (b.p. 187° to 190° C./6 mmHg, m.p. 61° to 62° C.).

From the following analysis result, it was confirmed that the product was $C_{16}H_{18}ClNO$.

| | C | H | N |
|---|---|---|---|
| Theoretical | 69.69 | 6.53 | 5.08 |
| Found | 69.71 | 6.48 | 5.02 |

Then 5 g of the compound (XXXVI), 5.7 g of the compound (VIII) and 40 g of concentrated sulfuric acid were stirred at ordinary temperature for 44 hours, and the product was discharged into 500 ml of water. The precipitate was filtered off, washed with an aqueous solution of caustic soda, and recrystallized with 100 ml of toluene. Then 4 g (42.1 percent of theoretical yield) of 2-(4'-chloro-N-ethylanilino)-6-diethylaminofluroan (XXXV) was obtained. The product was a white powder (m.p. 156° to 158° C.) and developed a green color in the presence of clay, resin and bisphenol A respectively.

From the following analysis result, it was confirmed that the product was $C_{32}H_{29}ClN_2O_3$.

| | C | H | N |
|---|---|---|---|
| Theoretical | 73.21 | 5.53 | 5.34 |
| Found | 72.98 | 5.52 | 5.26 |

EXAMPLE 16

Preparation of
2-(4'-chloro-3'-methylanilino)-3-methyl-6-dimethylaminofluoran (XXXVII)

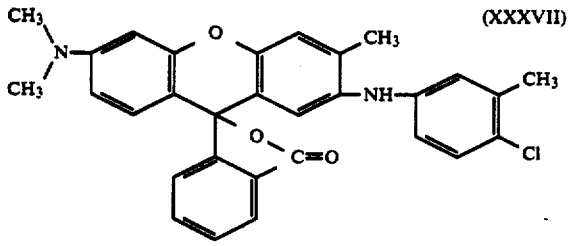

(XXXVII)

11.45 g of the compound (XXVI, see EXAMPLE 10), 12.5 g of 4-dimethylamino-2-hydroxy-2'-carboxybenzophenone and 70 g of concentrated sulfuric acid were stirred at ordinary temperature for 40 hours, and the product was discharged into 1 l of water. The precipitate was filtered off, washed with aqueous solution of caustic soda, and recrystallized with 200 ml of toluene. Then 15.8 g (72.5 percent of theoretical yield) of 2-(4'-chloro-3'-methylanilino)-3-methyl-6-dimethylaminofluoran (XXXVII) was obtained. The product was a white powder (m.p. 215° to 216° C.) and developed a black color in the presence of clay, resin and bisphenol A.

From the following analysis result, it was confirmed that the product was $C_{30}H_{25}ClN_2O_3$.

| | C | H | N |
|---|---|---|---|
| Theoretical | 72.50 | 5.04 | 5.64 |
| Found | 72.70 | 5.09 | 5.47 |

EXAMPLE 17

Preparation of pressure sensitive copying paper 5 g of 2-p-chloroanilino-6-diethylaminofluoran (VI, Example 1) is heated with 120 g of mono-isopropyl biphenyl up to 100° C. and dissolved into the latter, and then emulsified together with a solution of 25 g of gum arabic in 400 ml of water. Next, a solution of 25 g of gelatin in 400 ml of water is added to complete the emulsification, and acetic acid is added to adjust so as to obtain pH 4. At this time, liquid films of gelatin/gum arabic are formed around oil drops containing fluoran compound. 500 ml of water is added to the emulsion, and then it is cooled to below 10° C. 5 ml of 37 percent formalin solution is added to cure the films. A solution of 10% caustic soda is added to adjust so as to obtain pH 9, and the temperature is slowly restored to room temperature. The suspension thus obtained is applied to the under surface of upper leaf, and it is dried. Meanwhile, solid acid such as active clay, phenol compound, etc. is applied to the upper surface of lower leaf.

When copying is carried out by means of the upper leaf and lower leaf prepared by the above-mentioned method, the lower leaf which has active clay or phenol compound on its upper surface rapidly develops green color.

EXAMPLE 18

Preparation of heat-sensitive copying paper

35 G of 2-p-chloroanilino-3-methyl-6-diethylamino fluoran (XVII, Example 6), 150 g of 10 weight percent polyvinyl alcohol aqueous solution, and 65 g of water are ground and mixed for an hour. (A liquid).

Meanwhile, 35 g of bisphenol A, 150 g of 10 weight percent polyvinyl alcohol aqueous solution, and 65 g of water are ground and mixed for an hour. (B liquid)

Next, 3 weight parts of A liquid and 67 weight parts of B liquied are mixed and disparsed, and then applied to paper.

When the heat-sensitive copying paper thus prepared is added heat partially by means of a thermal pen or an exothermic head, it rapidly develops black color.

I claim:

[1. A heat or pressure sensitive copying paper containing a fluoran compound as a color former, said color being developed in said heat or pressure sensitive copying paper through the application of heat or pressure, said fluoran compound being of the formula

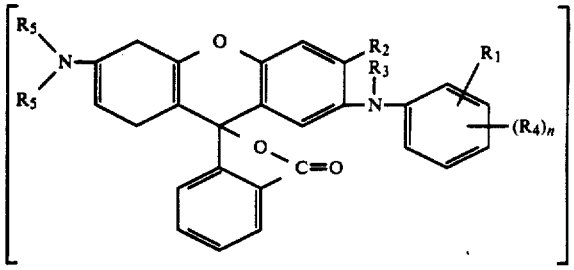

wherein $R_1$ is halogen; $R_2$ is hydrogen or methyl; $R_3$ is hydrogen, methyl or ethyl; each of $R_4$ is independently halogen or methyl; $R_5$ is methyl or ethyl; and n is 0 or an integer from 1 to 4.]

[2. A heat or pressure sensitive copying paper of claim 1 wherein said fluoran is 2-p-chloroanilino-6-diethylaminofluoran.]

[3. A heat or pressure sensitive copying paper of claim 1 wherein said fluoran is 2-m-chloroanilino-6-diethylaminofluoran.]

[4. A heat or pressure sensitive copying paper of claim 1 wherein said fluoran is 2-o-chloroanilino-6-diethylaminofluoran.]

[5. A heat or pressure sensitive copying paper of claim 1 wherein said fluoran is 2-(3',5'-dichloroanilino)-6-diethylaminofluoran.]

[6. A heat or pressure sensitive copying paper of claim 1 wherein said fluoran is 2-(3',4'-dichloroanilino)-6-diethylaminofluoran.]

[7. A heat or pressure sensitive copying paper of claim 1 wherein said fluoran is 2-p-chloroanilino-3-methyl-6-diethylaminofluoran.]

[8. A heat or pressure sensitive copying paper of claim 1 wherein said fluoran is 2-m-chloroanilino-3-methyl-6-diethylaminofluoran.]

[9. A heat or pressure sensitive copying paper of claim 1 wherein said fluoran is 2-o-chloroanilino-3-methyl-6-diethylaminofluoran.]

[10. A heat or pressure sensitive copying paper of claim 1 wherein said fluoran is 2-p-bromoanilino-3-methyl-6-diethylaminofluoran.]

[11. A heat or pressure sensitive copying paper of claim 1 wherein said fluoran is 2-(4'-chloro-3'-methylanilino)-3-methyl-6-diethylaminofluoran.]

[12. A heat or pressure sensitive copying paper of claim 1 wherein said fluoran is 2-(3',5'-dichloroanilino)-3- methyl-6-diethylaminofluoran.]

[13. A heat or pressure sensitive copying paper of claim 1 wherein said fluoran is 2-(3',4'-dichloroanilino)-3-methyl-6-diethylaminofluoran.]

[14. A heat or pressure sensitive copying paper of claim 1 wherein said fluoran is 2-(2',5'-dichloroanilino)-6-diethylaminofluoran.]

[15. A heat or pressure sensitive copying paper of claim 1 wherein said fluoran is 2-(4'-chloro-N-methylanilino)-6-diethylaminofluoran.]

[16. A heat or pressure sensitive copying paper of claim 1 wherein said fluoran is 2-(4'-chloro-N-ethylanilino)-6-diethylaminofluoran.]

[17. A heat or pressure sensitive copying paper of claim 1 wherein said fluoran is 2-(4'-chloro-3-'-methylanilino)-3-methyl-6-dimethylaminofluoran.]

[18. A heat sensitive copying paper of claim 1.]

[19. A pressure sensitive copying paper of claim 1.]

*20. A heat or pressure sensitive copying paper containing a fluoran compound as a color former, said color being developed in said heat or pressure sensitive copying paper through the application of heat or pressure, said fluoran compound being selected from the group consisting of 2-m-chloroanilino-6-diethylaminofluoran; 2-o-chloroanilino-6-diethylaminofluoran; 2-(3',5'-dichloroanilino)-6-diethylaminofluoran; 2-(3',4'-dichloroanilino)-6-diethylaminofluoran; 2-p-chloroanilino-3-methyl-6-diethylaminofluoran; 2-m-chloroanilino-3-methyl-6-diethylaminofluoran; 2-o-chloroanilino-3-methyl-6-diethylaminofluoran; 2-p-bromoanilino-3-methyl-6-diethylaminofluoran; 2-(4'-chloro-3'-methylanilino)-3-methyl-6-diethylaminofluoran; 2-(3',5'-dichloroanilino)-3-methyl-6-diethylaminofluoran; 2-(3',4'-dichloroanilino)-3-methyl-6-diethylaminofluoran; 2-(2',5'-dichloroanilino)-6-diethylaminofluoran; 2-(4'-chloro-N-methylanilino)-6-diethylaminofluoran; 2-(4'-chloro-N-ethylanilino)-6-diethylaminofluoran and 2-(4'-chloro-3'-methylanilino)3-methyl-6-dimethylaminofluoran.*

*21. A heat sensitive copying paper containing a fluoran compound as a color former, said color being developed in said heat sensitive copying paper through the application of heat, said fluoran compound being 2-m-chloroanilino-6-diethylaminofluoran.*

*22. A heat sensitive copying paper containing a fluoran compound as a color former, said color being developed in said heat sensitive copying paper through the application of heat, said fluoran compound being 2-o-chloroanilino-6-diethylaminofluoran.*

* * * * *